(12) United States Patent
Fukunishi et al.

(10) Patent No.: US 9,708,477 B2
(45) Date of Patent: Jul. 18, 2017

(54) COPOLYMER, RUBBER COMPOSITION AND PNEUMATIC TIRE

(71) Applicant: Toyo Tire & Rubber Co., Ltd., Osaka-shi, Osaka (JP)

(72) Inventors: Satoshi Fukunishi, Osaka (JP); Takashi Yuri, Osaka (JP)

(73) Assignee: TOYO TIRE & RUBBER CO., LTD., Osaka-shi (JP)

( * ) Notice: Subject to any disclaimer, the term of this patent is extended or adjusted under 35 U.S.C. 154(b) by 0 days.

(21) Appl. No.: 14/967,783

(22) Filed: Dec. 14, 2015

(65) Prior Publication Data
US 2016/0176999 A1    Jun. 23, 2016

(30) Foreign Application Priority Data

Dec. 17, 2014  (JP) ................................ 2014-255250
Oct. 20, 2015  (JP) ................................ 2015-206529

(51) Int. Cl.
| | |
|---|---|
| C08F 236/22 | (2006.01) |
| C08F 212/06 | (2006.01) |
| C08L 7/00 | (2006.01) |
| C08L 9/06 | (2006.01) |
| C08L 25/16 | (2006.01) |
| C08F 212/12 | (2006.01) |
| C08L 9/00 | (2006.01) |

(52) U.S. Cl.
CPC .............. *C08L 9/06* (2013.01); *C08F 212/12* (2013.01); *C08F 236/22* (2013.01); *C08L 7/00* (2013.01); *C08L 9/00* (2013.01); *C08L 25/16* (2013.01)

(58) Field of Classification Search
CPC ..... C08F 236/22; C08F 212/06; C08F 212/08
See application file for complete search history.

(56) References Cited

U.S. PATENT DOCUMENTS

| | | | | |
|---|---|---|---|---|
| 2,383,084 | A * | 8/1945 | Rummelsburg | ...... C08F 236/22 526/194 |
| 2,549,539 | A * | 4/1951 | Sparks | ................. C08F 212/08 524/313 |
| 2,978,426 | A * | 4/1961 | Zapp | ................... B01J 13/0013 156/123 |
| 3,919,181 | A * | 11/1975 | Petersen | ................... C08F 4/16 526/281 |
| 4,866,131 | A | 9/1989 | Fujimaki et al. | |
| 2005/0119399 | A1 | 6/2005 | Nishioka et al. | |
| 2014/0100316 | A1 | 4/2014 | Washizu | |
| 2014/0296373 | A1* | 10/2014 | Mabuchi | ............... B60C 1/0016 523/156 |
| 2015/0038657 | A1* | 2/2015 | Washizu | ................... C08L 9/00 526/173 |

FOREIGN PATENT DOCUMENTS

| | | | | |
|---|---|---|---|---|
| JP | 61-203145 | A | 9/1986 | |
| JP | 9-328577 | | 12/1997 | |
| JP | 2005-154696 | A | 6/2005 | |
| JP | WO 2013128977 | A1 * | 9/2013 | ............... C08L 9/00 |
| JP | 2014-88544 | A | 5/2014 | |

OTHER PUBLICATIONS

Sivola (The n-butyllithium-initiated polymerization of myrcene and its copolymerization with styrene. Acta Polytechnica Scandinavica. 1977, 65 pages).*

* cited by examiner

*Primary Examiner* — Brieann R Fink
(74) *Attorney, Agent, or Firm* — Westerman, Hattori, Daniels & Adrian, LLP

(57) ABSTRACT

Disclosed is a copolymer including a monomer unit (a) derived from a compound represented by the formula (1) and a monomer unit (b) derived from a compound represented by the formula (2), and having a weight average molecular weight (Mw) of from 1,000 to 50,000

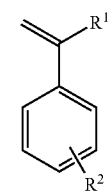

(1)

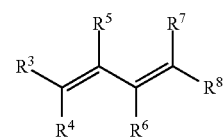

(2)

wherein $R^1$ represents a hydrogen atom or a methyl group, $R^2$ represents a hydrogen atom, a linear alkyl group having from 1 to 8 carbon atoms, or a branched alkyl group having from 3 to 8 carbon atoms, $R^3$, $R^4$, $R^5$, $R^6$, $R^7$ and $R^8$ may be the same or different, at least one of those groups represents an aliphatic hydrocarbon group having from 3 to 8 carbon atoms, and the remainder represents a hydrogen atom or an aliphatic hydrocarbon group having 1 or 2 carbon atoms.

9 Claims, No Drawings

COPOLYMER, RUBBER COMPOSITION AND PNEUMATIC TIRE

CROSS-REFERENCE TO RELATED APPLICATIONS

This application is based upon and claims the benefit of priority from the prior Japanese Patent Applications No. 2014-255250, filed on Dec. 17, 2014 and No. 2015-206529, filed on Oct. 20, 2015; the entire contents of which are incorporated herein by reference.

BACKGROUND

1. Technical Field

The present invention relates to a copolymer including a monomer unit derived from an aromatic vinyl compound and a monomer unit derived from a compound containing conjugated diene, a rubber composition including the copolymer, and a pneumatic tire including the rubber composition.

2. Related Art

Conventionally, for example, it is required in a rubber composition used in a tire to balance grip performance on a wet road surface (wet grip performance) and rolling resistance performance contributing to low fuel consumption in high dimension. In general, regarding wet grip performance, tan $\delta$ at 0° C. is used as an index, and the performance is excellent as the index is large. Regarding rolling resistance performance, tan $\delta$ at 60° C. is used as an index, and the performance is excellent as the index is small. Wet grip performance and rolling resistance performance are incompatible characteristics, and it is not easy to simultaneously improve those characteristics.

JP-A-H09-328577 proposes to add a copolymer resin (petroleum resin) of a C5 fraction by pyrolysis of naphtha and styrene or vinyl toluene to a diene rubber in order to improve wet grip performance without deteriorating rolling resistance performance. However, when a petroleum resin has been added, modulus of elasticity of a rubber composition increases at low temperature, and grip performance (low temperature characteristics) is deteriorated.

JP-A-S61-203145 discloses to add a low molecular weight styrene-butadiene liquid polymer together with a diene rubber in order to improve road surface grip power in a racing tire. However, when the liquid polymer has been added, the decrease of hardness of a rubber composition obtained is large, and the decrease of driving stability when the rubber composition is used in a tire is large.

JP-A-2005-154696 discloses to concurrently use a petroleum resin and a styrene-butadiene liquid polymer, but it is not easy to suppress the deterioration of the above-described low temperature characteristics and driving stability.

JP-A-2014-088544 discloses to use a branched conjugated diene copolymer obtained by incorporating a diene component such as myrcene in a styrene-butadiene rubber as a rubber component of a rubber composition for a tire in order to achieve both wet grip performance and rolling resistance performance. However, this patent document is to incorporate a branched conjugated diene compound such as myrcene as a monomer unit for the purpose of improving characteristics of a styrene-butadiene rubber having high styrene content. The copolymer is used as a rubber component, and therefore has high molecular weight, and it is not easy to suppress the deterioration of low temperature characteristics.

SUMMARY

An object of the embodiment is to provide a copolymer that can improve the balance between tan $\delta$ at 0° C. and tan $\delta$ at 60° C. when the copolymer is used in a rubber composition.

The copolymer according to the embodiment includes a monomer unit (a) derived from a compound represented by the following formula (1) and a monomer unit (b) derived from a compound represented by the following formula (2), the copolymer having a weight average molecular weight (Mw) of from 1,000 to 50.000:

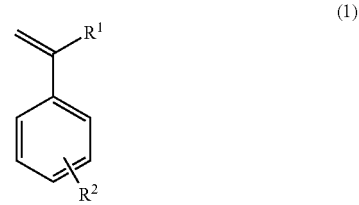

wherein $R^1$ represents a hydrogen atom or a methyl group, $R^2$ represents a hydrogen atom, a linear alkyl group having from 1 to 8 carbon atoms, or a branched alkyl group having from 3 to 8 carbon atoms;

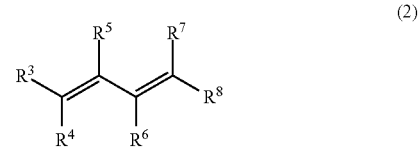

wherein $R^3$, $R^4$, $R^5$, $R^6$, $R^7$ and $R^8$ may be the same or different, at least one of those groups represents an aliphatic hydrocarbon group having from 3 to 8 carbon atoms, and the remainder represents a hydrogen atom or an aliphatic hydrocarbon group having 1 or 2 carbon atoms.

The rubber composition according to the embodiment includes 100 parts by mass of a rubber component including a diene rubber, and from 1 to 100 parts by mass of the copolymer.

The pneumatic tire according to the embodiment includes the rubber composition as a part thereof.

According to the embodiment, a copolymer that can improve the balance between tan $\delta$ at 0° C. and tan $\delta$ at 60° C. while suppressing the decrease of hardness and the increase of modulus of elasticity at low temperature when the copolymer is used in a rubber composition can be provided.

DETAILED DESCRIPTION

The embodiments of the invention are described in detail below.

The copolymer according to the embodiment includes a monomer unit (a) derived from a compound represented by the formula (1) (hereinafter referred to as an "aromatic vinyl compound") and a monomer unit (b) derived from a compound represented by the formula (2) (hereinafter referred to as a "conjugated diene-containing compound"), the copolymer having a weight average molecular weight (Mw) of from 1,000 to 50.000 and having fluidity at normal temperature (23° C.) (the copolymer being hereinafter referred to as a "liquid copolymer"). The liquid copolymer obtained by copolymerization of the aromatic vinyl compound and the conjugated diene-containing compound having a specific structure can improve the balance between tan δ at 0° C. and tan δ at 60° C. while suppressing the decrease of hardness and the increase of modulus of elasticity at low temperature when the copolymer is used in a rubber composition. As a result, the balance between wet grip performance and rolling resistance performance can be improved while suppressing deterioration of driving stability and low temperature characteristics when a rubber composition containing the liquid copolymer is used in a tire. The "monomer unit" (also called a "constituting unit") used herein means a basic unit of a chemical structure of a copolymer, and is a unit having a chemical structure formed by the reaction of the above-described compound as a monomer.

In the formula (1), $R^1$ is a hydrogen atom or a methyl group, and preferably a hydrogen atom. $R^2$ is a hydrogen atom, a linear alkyl group having from 1 to 8 carbon atoms, or a branched alkyl group having from 3 to 8 carbon atoms, and preferably a hydrogen atom, a linear alkyl group having from 1 to 4 carbon atoms, or a branched alkyl group having 3 or 4 carbon atoms. $R^2$ may be present at any of an ortho (o-) position, a meta (m-) position and a para (p-) position of an aromatic ring, and preferably a meta position and/or a para position.

Examples of the aromatic vinyl compound represented by the formula (1) include styrene. α-methylstyrene, methylstyrene (ortho position, meta position, para position or a mixture of two or more thereof), ethylstyrene (ortho position, meta position, para position or a mixture of two or more thereof), propylstyrene (ortho position, meta position, para position or a mixture of two or more thereof), isopropylstyrene (ortho position, meta position, para position or a mixture of two or more thereof), butylstyrene (ortho position, meta position, para position or a mixture of two or more thereof), isobutylstyrene (ortho position, meta position, para position or a mixture of two or more thereof), t-butylstyrene (ortho position, meta position, para position or a mixture of two or more thereof), s-butylstyrene (ortho position, meta position, para position or a mixture of two or more thereof), pentylstyrene (ortho position, meta position, pan position or a mixture of two or more thereof), hexyistyrene (ortho position, meta position, para position or a mixture of two or more thereof), heptylstyrene (ortho position, meta position, para position or a mixture of two or more thereof) and octylstyrene (ortho position, meta position, para position or a mixture of two or more thereof). Those compounds can be used alone or as mixtures of two or more thereof. Of those compounds, at least one selected from the group consisting of styrene, methylstyrene and tert-butylstyrene is preferred.

In the formula (2), $R^3$, $R^4$, $R^5$, $R^6$, $R^7$ and $R^8$ may be the same or different, at least one of those groups is an aliphatic hydrocarbon group having from 3 to 8 carbon atoms, and the remainder is a hydrogen atom or an aliphatic hydrocarbon group having 1 or 2 carbon atoms. Preferably, one of $R^3$, $R^4$, $R^5$, $R^6$, $R^7$ and $R^8$ is an aliphatic hydrocarbon group having from 3 to 8 carbon atoms, 0 to 2 groups of those is an aliphatic hydrocarbon group having 1 or 2 carbon atoms, and the remaining 3 to 5 groups are a hydrogen atom.

The aliphatic hydrocarbon group having from 3 to 8 carbon atoms is preferably an unsaturated aliphatic hydrocarbon group containing at least one double bond, and may be linear or branched. The aliphatic hydrocarbon group is preferably a branched unsaturated hydrocarbon group having one methyl group as a side chain and having 1 or 2 double bonds. The carbon atom number of the aliphatic hydrocarbon group is preferably from 4 to 6. Preferred specific examples of the aliphatic hydrocarbon group include a 4-methyl-3-pentenyl group, a 3-methyl-2-butenyl group, a 2-methyl-1-propenyl group and a 2-methyl-1,3-butadienyl group.

The aliphatic hydrocarbon group having 1 or 2 carbon atoms is preferably a saturated aliphatic hydrocarbon group, specifically, a methyl group or an ethyl group, and more preferably a methyl group.

In one preferred embodiment, $R^3$, $R^4$, $R^5$, $R^6$, $R^7$ and $R^8$ are that any one of $R^3$, $R^4$ and $R^5$ is an unsaturated aliphatic hydrocarbon group having from 3 to 8 (preferably from 4 to 6) carbon atoms, the remaining 5 groups which may be the same or different are a hydrogen atom or a methyl group, and at least one of $R^7$ and $R^8$ is a hydrogen atom.

The conjugated diene-containing compound represented by the formula (2) is a compound having an aliphatic hydrocarbon group having from 3 to 8 carbon atoms bonded to a conjugated diene structure. When the compound having such a specific structure is copolymerized with the aromatic vinyl compound, coupled with the copolymer being a liquid polymer, the characteristics of the rubber composition can be improved, as described above. Specific examples of the conjugated diene-containing compound include 2-methyl-4-methylenehexa-1,5-diene, 2-methyl-6-methyleneocta-1,7-diene (that is, α-myrcene), 2-methyl-8-methylenedeca-1,9-diene, 5-methyl-3-methylenehexa-1,4-diene, 7-methyl-3-methyleneocta-1,6-diene (that is, β-myrcene), 9-methyl-3-methylenedeca-1,8-diene, 3,7-dimethylocta-1,3,7-triene (that is, α-ocimene), 3,9-dimethyldeca-1,3,9-triene, 3,7-dimethylocta-1,3,6-triene (that is, β-ocimene), 3,9-dimethyldeca-1,3,8-triene, 2,6-dimethylocta-2,4,6-triene (that is, allo-ocimene), 2,8-dimethyldeca-2,6,8-triene and 2,6-dimethylocta-1,3,5,7-tetraene (that is, cosmene). Those compounds can be used alone or as mixtures of two or more thereof. Of those compounds, at least one selected from the group consisting of myrcene, ocimene, allo-ocimene and cosmene is preferred, and at least one selected from the group consisting of myrcene, ocimene and allo-ocimene is more preferred. The myrcene may be α-myrcene, β-myrcene or a mixture thereof. The ocimene may be α-ocimene, β-ocimene (which may be trans form or a cis form) or a mixture thereof. The conjugated diene-containing compound according to the preferred embodiment is at least one selected from the group consisting of β-myrcene, β-ocimene and allo-ocimene.

In the liquid copolymer, a copolymerization ratio of the monomer unit (b) (that is, the content (molar ratio) of the monomer unit (b) to the entire monomer units constituting the liquid copolymer) is preferably from 20 to 80 mol %, more preferably from 50 to 80 mol %, and still more preferably from 60 to 80 mol %. When the copolymerization ratio of the monomer unit (b) is 20 mol % or more, the effect of suppressing the deterioration of low temperature characteristics can be improved. When the copolymerization ratio of the monomer unit (b) is 80 mol % or less, the effect of suppressing the decrease of hardness can be improved.

In the liquid copolymer, a copolymerization ratio of the monomer unit (a) (that is, the content (molar ratio) of the monomer unit (a) to the entire monomer units constituting the liquid copolymer) is preferably from 20 to 80 mol %, more preferably from 20 to 50 mol %, and still more preferably from 20 to 40 mol %. The monomer units constituting the liquid copolymer basically consist of the monomer units (a) and (b), but may further include monomers such as other vinyl compound or diene compound in an amount that does not impair the effects of the embodiment. Although not particularly limited, the total content of the monomer units (a) and (b) to the entire monomer units constituting the liquid copolymer is preferably 90 mol % or more, more preferably 95 mol % or more, and still more preferably 100 mol %.

The monomer unit (a) derived from the aromatic vinyl compound is represented by the following formula (3). The monomer unit (b) derived from the conjugated diene-containing compound can be represented by, for example, any one of the following formulae (4) to (6). Therefore, the liquid copolymer according to one embodiment includes the monomer unit represented by the formula (3) and at least one selected from the group consisting of the monomer units represented by the formulae (4) to (6).

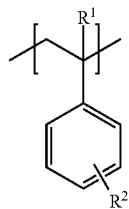

(3)

wherein $R^1$ and $R^2$ are the same as defined in the formula (1).

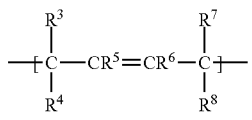

(4)

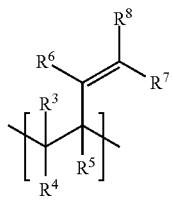

(5)

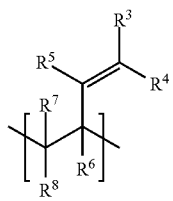

(6)

wherein $R^3$, $R^4$, $R^5$, $R^6$, $R^7$ and $R^8$ are the same as defined in the formula (2).

The monomer unit represented by the formula (4) includes a trans-form monomer unit represented by the following formula (4A) and/or a cis-form monomer unit represented by the following formula (4B).

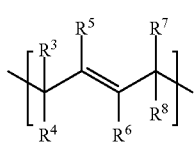

(4A)

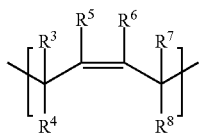

(4B)

The content of each monomer unit represented by the formulae (4) to (6) is not particularly limited, and as an example, as a ratio to the monomer unit (b), the monomer unit represented by the formula (4) may be from 1 to 100 mol %, the monomer unit represented by the formula (5) may be from 0 to 99 mol %, and the monomer unit represented by the formula (6) may be from 0 to 99 mol %. As a ratio to the monomer unit (b), the monomer unit represented by the formula (4) may be from 10 to 90 mol %, and preferably from 60 to 80 mol %, the monomer unit represented by the formula (5) may be from 1 to 40 mol %, and preferably from 2 to 15 mol %, and the monomer unit represented by the formula (6) may be from 1 to 50 mol %, and preferably from 10 to 30 mol %.

The weight average molecular weight (Mw) of the liquid copolymer is from 1,000 to 50,000 as described before, and from the standpoint of enhancing the effect of improving characteristics of the robber composition, is preferably from 5,000 to 40,000, and more preferably from 10,000 to 30,000. The number average molecular weight (Mn) of the liquid copolymer is not particularly limited, and is, for example, from 500 to 30,000, and preferably from 5,000 to 20,000. The molecular weight distribution (Mw/Mn) of the liquid copolymer is not particularly limited, and is, for example, from 1.01 to 10.0, and preferably from 1.10 to 5.00.

The glass transition temperature (Tg) of the liquid copolymer is preferably from −60 to 20° C. When the liquid copolymer has the glass transition temperature in such a range, the effect of improving the balance between tan δ at 0° C. and tan δ at 60° C. can be increased when the copolymer is used in a robber composition. The glass transition temperature of the liquid copolymer is more preferably from −40 to 10° C., and still more preferably −30 to 5° C.

The liquid copolymer may be a random copolymer or a block copolymer so long as it is a copolymer obtained by the copolymerization of the aromatic vinyl compound and the conjugated diene-containing compound as monomer components. Of those, the random copolymer is preferred.

The method for producing the liquid copolymer is not particularly limited, and the liquid copolymer can be prepared using the conventional polymerization method. For example, the liquid copolymer can be prepared by radical polymerization using an initiator including an azo compound. Examples of the azo compound as a radical initiator include 2,2'-azobisisobutyronitrile (AIBN), 1,1'-azobis(cyclohexanecarbonitrile) (ABCN), 2,2'-azobis(2,4,4-trimethylpentane), 2,2'-azobis(2-methylpropane), 2,2'-azobis(2-methylbutyronitrile), 2,2'-azobis(2,4-dimethylvaleronitrile), 2,2'-azobis(4-methoxy-2,4-dimethylvaleronitrile), and 2,2'-azobis[N-(2-propenyl)-2-methylpropionamide].

As one example, the liquid copolymer thus obtained can be used by adding to a rubber composition. Specifically, the rubber composition according to the embodiment may include from 1 to 100 parts by mass of the liquid copolymer, per 100 parts by mass of a rubber component including a diene rubber.

Examples of the diene rubber as the rubber component include natural rubber (NR), synthetic isoprene rubber (IR), butadiene rubber (BR), styrene-butadiene rubber (SBR), nitrile rubber (NBR), chloroprene rubber (CR), butyl rubber (IR), styrene-isoprene copolymer rubber, butadiene-isoprene copolymer rubber and styrene-isoprene-butadiene copolymer rubber. Those diene rubbers can be used alone or as mixtures of two or more thereof. Of those diene rubbers, at least one selected from the group consisting of NR, BR and SBR is preferably used. Modified diene rubbers modified with at least one functional group selected from the group consisting of an amino group, a hydroxyl group, an epoxy group, an alkoxy group, an alkylsilyl group, an alkoxysilyl group and a carboxyl group in molecular terminal or molecular chain of those, or modified diene rubbers modified with compounds containing tin can be used. As one embodiment, the rubber component may contain 50 mass % or more of modified SBR. The diene rubber as a rubber component is a solid rubber that does not have fluidity at normal temperature (23° C.), and the liquid copolymer is not included in the rubber component.

From the standpoint of the improvement of the balance between wet grip performance and rolling resistance performance, the amount of the liquid copolymer added is preferably from 1 to 100 parts by mass, more preferably from 1 to 50 parts by mass, still more preferably from 2 to 30 parts by mass, and may be from 3 to 20 parts by mass, per 100 parts by mass of the rubber component.

The rubber composition according to the embodiment can contain various additives generally used in a rubber composition, such as a reinforcing filler, a silane coupling agent, an oil, zinc flower, stearic acid, an age resister, a wax, a vulcanizing agent and a vulcanization accelerator, in addition to the liquid copolymer.

As the reinforcing filler, silica such as wet silica (hydrous silicic acid), and/or carbon black are preferably used, and silica is more preferably used to improve the balance between rolling resistance performance and wet grip performance. Use of silica alone or concurrent use of silica and carbon black is preferred. It is preferred that the reinforcing filler includes silica as a main component, that is, 50 mass % or more of the reinforcing filler is silica. The amount of the reinforcing filler added is not particularly limited, and is, for example, from 20 to 150 parts by mass, and preferably from 30 to 100 parts by mass, per 100 parts by mass of the rubber component. The amount of the silica added is not particularly limited, and is, for example, from 20 to 120 parts by mass, and preferably from 30 to 90 parts by mass, per 100 parts by mass of the rubber component.

When silica is added, it is preferred to use the silica together with a silane coupling agent. Examples of the silane coupling agent include sulfide silane such as bis(3-triethoxysilylpropyl)tetrasulfide, bis(3-triethoxysilylpropyl)disulfide, bis(2-triethoxysilylethyl)tetrasulfide, bis(4-triethoxysilylbutyl)disulfide, bis(3-trimethoxysilylpropyl)tetrasulfide or bis(2-trimethoxysilylethyl)disulfide; mercaptosilane such as 3-mercaptopropyltrimethoxysilane, 3-mercaptopropyltriethoxysilane, 3-mercaptopropylmethyldimethoxysilane, 3-mercaptopropyldimethylmethoxysilane or mercaptoethyltriethoxysilane; and protected mercaptosilane such as 3-octanoylthio-1-propyltriethoxysilane or 3-propionylthiopropyltrimethoxysilane. Those silane coupling agents can be used alone or as mixtures of two or more thereof. The amount of the silane coupling agent added is preferably from 2 to 20 mass %, and more preferably from 4 to 15 mass %, based on the mass of silica.

Sulfur is preferably used as the vulcanizing agent. The amount of the vulcanizing agent added is not particularly limited, but is preferably from 0.1 to 10 parts by mass, and more preferably from 0.5 to 5 parts by mass, per 100 parts by mass of the rubber component. Examples of the vulcanization accelerator that can be used include various vulcanization accelerators such a sulfenamide type, a thiuram type, a thiazole type or guanidine type. Those can be used alone or as mixtures of two or more thereof. The amount of the vulcanization accelerator added is not particularly limited, but is preferably from 0.1 to 7 parts by mass, and more preferably from 0.5 to 5 parts by mass, per 100 parts by mass of the rubber component.

The rubber composition according to the embodiment can be prepared by kneading the necessary components according to the conventional method using a mixing machine generally used, such as Banbury mixer, a kneader or rolls. Specifically, for example, other additives excluding a vulcanizing agent and a vulcanization accelerator are added to a diene rubber together with a liquid copolymer, followed by kneading, in a first mixing step. A vulcanizing agent and a vulcanization accelerator are then added to the mixture thus obtained, followed by kneading, in a final mixing step. Thus, a rubber composition can be prepared.

The rubber composition thus obtained can be used in various rubber members for tires, vibration proof rubber, conveyer belts and the like. The rubber composition is preferably used in tires, and can be applied to various uses such as tires for passenger cars, and large-sized tires for trucks or buses, and each site of a tire, such as a tread part or a side wall part of pneumatic tires having various sizes. That is, the rubber composition is formed into a predetermined shape according to the conventional method, for example, by extrusion, is combined with other parts, and is then vulcanization-molded at a temperature of, for example, from 140 to 180° C. Thus, a pneumatic tire can be produced. The rubber composition is particularly preferably used in the formulation for a tread of a tire.

EXAMPLES

Examples of the embodiment are described below, but the embodiment is not construed as being limited to those examples.

Components used in examples and comparative examples are as follows.

SBR: "SL563" manufactured by JSR Corporation

Modified SBR: Modified SBR terminated with an alkoxyl group and an amino group, "HPR350" manufactured by JSR Corporation

NR: RSS#3

BR: "UBEPOL BR150B" manufactured by Ube Industries, Ltd.

Silica: "NIPSIL AQ" manufactured by Tosoh Silica Corporation

Carbon black: "SEAST 3" manufactured by Tokai Carbon Co., Ltd.

Silane coupling agent 1: Bis(3-triethoxysilylpropyi)tetrasulfide, "Si69" manufactured by Evonik Degussa Silane coupling agent 2: Mercaptosilane, "Si363" manufactured by Evonik Degussa Zinc flower: "Zinc Flower #1" manufactured by Mitsui Mining & Smelting Co., Ltd.

Age resister: "NOCRAC 6C" manufactured by Ouchi Shinko Chemical Industrial Co., Ltd.

Stearic acid: "LUNAC S-20" manufactured by Kao Corporation

Sulfur: "Powder Sulfur for Rubber 150 mesh" manufactured by Hosoi Chemical Industry Co., Ltd.

Vulcanization accelerator "NOCCELER CZ" manufactured by Ouchi Shinko Chemical Industrial Co., Ltd.

Secondary vulcanization accelerator: "NOCCELER D" manufactured by Ouchi Shinko Chemical Industrial Co., Ltd.

Polymers 1 to 8: Polymers obtained in Synthesis Examples 1 to 8

Polymer 9: Aromatic aliphatic copolymer-based petroleum resin "PETROTACK 100" manufactured by Tosoh Corporation Polymer 10: Liquid styrene-butadiene rubber "KURAPRENE L-SBR820" manufactured by Kuraray Co., Ltd.

Polymer 11: Obtained in Synthesis Example 9

Measurement methods of Mw, Mn, Mw/Mn and Tg of polymers (copolymers) are as follows.

Mw, Mn and Mw/Mn: Obtained in terms of polystyrene by measurement with gel permeation chromatography (GPC). In detail, 0.2 mg of a polymer was dissolved in 1 mL of THF, and this was used as a measurement sample. "LC-20DA" manufactured by Shimadzu Corporation was used. A sample was passed through a filter. Thereafter, the sample was passed through a column ("PL Gel 3 μm Guard×2" manufactured by Polymer Laboratories) in a flow rate of 0.7 mL/min at a temperature of 40° C. and detected with "RI Detector" manufactured by Spectra System.

Tg: Measured in a temperature rising rate of 20° C./min (measurable temperature range: −150 to 50° C.) by a differential scanning calorimetry (DSC) according to JIS K7121

Synthesis Example 1: Synthesis of Polymer 1 (Liquid Copolymer)

60 g of 4-t-butylstyrene, 12.8 g of β-myrcene (manufactured by Tokyo Chemical Industry Co., Ltd.), 0.77 g of azobisisobutyronitrile and 50 mL of toluene were mixed, followed by bubbling with nitrogen for 1 hour, and the resulting reaction solution was maintained at 70° C. for 24 hours. The solution obtained was subjected to reprecipitation purification in methanol, and 66 g of polymer 1 was obtained. Polymerization conversion (percentage of amount formed/amount charged) was 91%. The polymer 1 obtained had Mw of 22,000. Mn of 12,000 and Mw/Mn of 1.83, and was a liquid copolymer having fluidity at normal temperature. Furthermore, the polymer had Tg of −5° C.

It was confirmed by $^{13}$C-NMR (400 MHz CDCl$_3$) that the polymer 1 is a random copolymer having monomer units represented by the following formulae (3-1), (4-1), (5-1) and (6-1). From the integral ratio of each peak, the respective contents were that the monomer unit of the formula (3-1) is 73 mol %, the monomer unit of the formula (4-1) is 20 mol %, the monomer unit of the formula (5-1) is 2 mol %, the monomer unit of the formula (6-1) is 5 mol %, and the total of the formulae (4-1), (5-1) and (6-1) is 27 mol % (copolymerization ratio of the monomer unit (b) derived from β-myrcene-27 mol %). The formula (4-1) shows a trans-form for convenience, but in this measurement, a trans-form and a cis-form are not distinguished with each other. Chemical shift of each peak is shown in Table 1 below. In Table 1, "(3-1)-8", for example, means carbon having the number 8 in the formula (3-1).

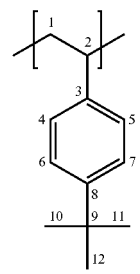

(3-1)

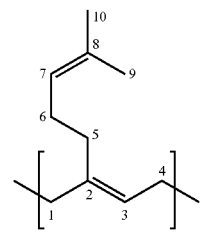

(4-1)

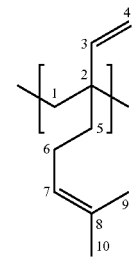

(5-1)

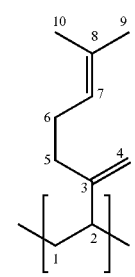

(6-1)

TABLE 1

| Peak Chemical Shift (TMS Standard = 0.0 ppm) | Carbon type |
|---|---|
| 148.5 | (3-1)-8 |
| 147.8 | (6-1)-3 |
| 146.3 | (5-1)-3 |
| 138.5 | (3-1)-3 |
| 138.0 | (4-1)-2 |
| 132.0 | (4-1)-8, (6-1)-8 |
| 131.3 | (5-1)-8 |
| 127.7 | (3-1)-4, (3-1)-5 |
| 125.2 | (3-1)-6, (3-1)-7 |
| 124.7 | (5-1)-7 |
| 123.5 | (4-1)-7, (6-1)-7 |
| 121.9 | (4-1)-3 |
| 112.6 | (5-1)-4 |
| 108.8 | (6-1)-4 |
| 63.0 | (5-1)-1 |
| 44.5 | (3-1)-1 |
| 42.7 | (5-1)-5 |
| 41.3 | (6-1)-2 |
| 39.9 | (3-1)-2 |

TABLE 1-continued

| Peak Chemical Shift (TMS Standard = 0.0 ppm) | Carbon type |
|---|---|
| 37.6 | (4-1)-1 |
| 35.5 | (6-1)-5 |
| 34.5 | (3-1)-9 |
| 34.0 | (6-1)-1 |
| 31.5 | (4-1)-5 |
| 31.0 | (3-1)-10, (3-1)-11, (3-1)-12 |
| 27.3 | (4-1)-4 |
| 26.7 | (4-1)-6, (6-1)-6 |
| 25.6 | (5-1)-2 |
| 24.8 | (4-1)-10, (5-1)-10, (6-1)-10 |
| 22.6 | (5-1)-6 |
| 18.6 | (4-1)-9, (5-1)-9, (6-1)-9 |

Synthesis Example 2: Synthesis of Polymer 2
(Liquid Copolymer)

Polymer 2 was obtained in the same manner as in Synthesis Example 1, except that the molar ratio between 4-t-butylstyrene and β-myrcene used in Synthesis of Polymer 1 was changed to 4-t-butylstyrene/β-myrcene=50/50. Polymerization conversion was 88%. The polymer 2 obtained had Mw of 20,000, Mn of 12,000 and Mw/Mn of 1.67, and was a liquid copolymer having fluidity at normal temperature. Furthermore, the polymer had Tg of −16° C. The content of each monomer unit of the polymer 2 was that the monomer unit of the formula (3-1) is 40 mol %, the monomer unit of the formula (4-1) is 45 mol %, the monomer unit of the formula (5-1) is 3 mol %, the monomer unit of the formula (6-1) is 12 mol %, and the total of the formulae (4-1), (5-1) and (6-1) is 60 mol %.

Synthesis Example 3: Synthesis of Polymer 3
(Liquid Copolymer)

Polymer 3 was obtained in the same manner as in Synthesis Example 1, except that the molar ratio between 4-t-butylstyrene and β-myrcene used in Synthesis of Polymer 1 was changed to 4-t-butylstyrene/β-myrcene=20/80. Polymerization conversion was 85%. The polymer 3 obtained had Mw of 18,000, Mn of 11,000 and Mw/Mn of 1.64, and was a liquid copolymer having fluidity at normal temperature. Furthermore, the polymer had Tg of −20° C. The content of each monomer unit of the polymer 3 was that the monomer unit of the formula (3-1) is 20 mol %, the monomer unit of the formula (4-1) is 60 mol %, the monomer unit of the formula (5-1) is 4 mol %, the monomer unit of the formula (6-1) is 16 mol %, and the total of the formulae (4-1), (5-1) and (6-1) is 80 mol %.

Synthesis Example 4: Synthesis of Polymer 4
(Liquid Copolymer)

Polymer 4 was obtained in the same manner as in Synthesis Example 2, except that β-ocimene (manufactured by Sigma Aldrich) was used in place of β-myrcene used in Synthesis of Polymer 2 (4-t-butylstyrene/β-ocimene (molar ratio)=50/50). Polymerization conversion was 90%. The polymer 4 obtained had Mw of 21,000, Mn of 13,000 and Mw/Mn of 1.62, and was a liquid copolymer having fluidity at normal temperature. Furthermore, the polymer had Tg of −5° C. The content of the monomer unit derived from 4-t-butylstyrene was 40 mol %, and the content of the monomer unit derived from β-ocimene was 60 mol %.

Synthesis Example 5: Synthesis of Polymer 5
(Liquid Copolymer)

Polymer 5 was obtained in the same manner as in Synthesis Example 2, except that methylstyrene (m- and p-mixture, manufactured by Tokyo Chemical Industry Co., Ltd.) was used in place of 4-t-butylstyrene used in Synthesis of Polymer 2 (methylstyrene/β-myrcene (molar ratio)=50/50). Polymerization conversion was 90%. The polymer 5 obtained had Mw of 23.000, Mn of 13,000 and Mw/Mn of 1.77, and was a liquid copolymer having fluidity at normal temperature. Furthermore, the polymer had Tg of −18° C. The content of the monomer unit derived from methylstyrene was 40 mol %, and the content of the monomer unit derived from β-myrcene was 60 mol %.

Synthesis Example 6: Synthesis of Polymer 6
(Liquid Copolymer)

Polymer 6 was obtained in the same manner as in Synthesis Example 2, except that styrene was used in place of 4-t-butylstyrene used in Synthesis of Polymer 2 (styrene/β-myrcene (molar ratio)=50/50). Polymerization conversion was 90%. The polymer 6 obtained had Mw of 24,000, Mn of 13,000 and Mw/Mn of 1.85, and was a liquid copolymer having fluidity at normal temperature. Furthermore, the polymer had Tg of −20° C. The content of the monomer unit derived from styrene was 40 mol %, and the content of the monomer unit derived from β-myrcene was 60 mol %.

Synthesis Example 7: Synthesis of Polymer 7
(Liquid Copolymer)

Polymer 7 was obtained in the same manner as in Synthesis Example 1, except that the molar ratio between 4-t-butylstyrene and β-myrcene used in Synthesis of Polymer 1 was changed to 4-t-butylstyrene/β-myrcene=90/10. Polymerization conversion was 95%. The polymer 7 obtained had Mw of 24,000, Mn of 13,000 and Mw/Mn of 1.85, and was a liquid copolymer having fluidity at normal temperature. Furthermore, the polymer had Tg of 0° C. The content of each monomer unit of the polymer 7 was that the monomer unit of the formula (3-1) is 87 mol %, and the total of the monomer units of the formulae (4-1), (5-1) and (6-1) is 13 mole %.

Synthesis Example 8: Synthesis of Polymer 8
(Liquid Copolymer)

Polymer 8 was obtained in the same manner as in Synthesis Example 1, except that the molar ratio between 4-t-butylstyrene and β-myrcene used in Synthesis of Polymer 1 was changed to 4-t-butylstyrene/β-myrcene=10/90. Polymerization conversion was nearly 100%. The polymer 8 obtained had Mw of 15,000, Mn of 9,000 and Mw/Mn of 1.67, and was a liquid copolymer having fluidity at normal temperature. Furthermore, the polymer had Tg of −28° C. The content of each monomer unit of the polymer 8 was that the monomer unit of the formula (3-1) is 10 mol %, and the total of the monomer units of the formulae (4-1), (5-1) and (6-1) is 90 mol %.

Synthesis Example 9: Synthesis of Polymer 11
(Liquid Copolymer) (Comparative Example)

Polymer 11 was obtained in the same manner as in Synthesis Example 2, except that isoprene was used in place of β-myrcene used in Synthesis of Polymer 2 (4-t-butylstyrene/isoprene (molar ratio)=50/50). Polymerization conversion was nearly 100%. The polymer 11 obtained had Mw of 22,000, Mn of 13,000 and Mw/Mn of 1.69, and was a liquid copolymer having fluidity at normal temperature. Furthermore, the polymer had Tg of −10° C.

Evaluation (1) of Rubber Composition

Labo mixer (laboplast mill) was used. According to the formulation (parts by mass) shown in Table 2 below, other compounding ingredients excluding sulfur and a vulcanization accelerator were added to a diene rubber, followed by kneading, in a first mixing step (discharge temperature: 160° C.). Sulfur and a vulcanization accelerator were added to the kneaded product obtained, followed by kneading in a final mixing step (discharge temperature: 90° C.). Thus, a rubber composition was prepared. The rubber composition for evaluation (1) is a silica-added rubber composition using a blend of modified SBR and unmodified BR as rubber components.

A test piece having a predetermined shape was prepared by vulcanizing each rubber composition obtained at 160° C. for 20 minutes. Dynamic viscoelasticity test was performed using the test piece obtained, and tan δ at 0° C. and 60° C. and storage modulus (E') at −10° C. were measured. Additionally, hardness at 23° C. was measured. Each measurement method is as follow.

0° C. tan δ: Loss factor tan δ was measured under the conditions of frequency: 10 Hz, static strain: 10%, dynamic strain: 2% and temperature: 0° C. using Rheospectrometer E4000 manufactured by UBM, and was indicated by an index as the value of Comparative Example 1 being 100. Tan δ is large and wet grip performance is excellent, as the index is large.

60° C. tan δ: Loss factor tan δ was measured in the same manner as in 0° C. tan δ, except for changing the temperature to 60° C., and was indicated by an index as the value of Comparative Example 1 being 100. Heat generation is difficult to occur, rolling resistance of a tire is small and rolling resistance performance (low fuel consumption) is excellent, as the index is small.

−10° C. E': Storage modulus E' was measured under the same conditions as in 0° C. tan δ, except for changing the temperature to −10° C. and was indicated by an index as the value of Comparative Example 1 being 100. E' at low temperature is small and grip performance at low temperature (low temperature characteristics) when a tire was manufactured is excellent, as the index is small.

23° C. Hardness: Hardness at a temperature 23° C. was measured with durometer type A according to JIS K6253, and was indicated by an index as the value of Comparative Example 1 being 100. Hardness at room temperature is high and driving stability when a tire was manufactured is excellent, as the index is large.

The results obtained are shown in Table 2. Examples 1 to 8 in which the polymers 1 to 8 which are specific liquid copolymers were used could improve the balance between tan δ at 0° C. and tan δ at 60° C. while suppressing the decrease of hardness at 23° C. and the increase of E' at −10° C., as compared with Comparative Example 1 as a control. In detail, tan δ at 0° C. could be increased while maintaining tan δ at 60° C. Particularly, Examples 1 to 6 in which the polymers 1 to 6 having a copolymerization ratio of the monomer unit (b) of from 20 to 80 mol % were used could balance tan δ at 0° C. and tan δ at 60° C. in high dimension without substantially involving the decrease of hardness at 23° C. and the increase of E' at −10° C.

On the other hand, in Comparative Example 2 in which the polymer 9 as a petroleum resin was used, the increase of E' at −10° C. was large, and low temperature characteristics were poor. In Comparative Example 3 in which the polymer 10 as a liquid styrene-butadiene rubber was used, the decrease of hardness at 23° C. was large, and driving stability was poor. In Comparative Example 4 in which the polymer 11 as a liquid copolymer of 4-t-butylstyrene and isoprene was used, the decrease of hardness at 23° C. was large, and driving stability was poor.

Example 7 showed the increase of E' at −10° C., but the increase width was smaller than that in Comparative Example 2, and the decrease of hardness at 23° C. as appeared in Comparative Example 2 was not observed. Therefore, in Example 7, the balance between tan δ at 0° C. and tan δ at 60° C. could be improved while suppressing the decrease of hardness at 23° C. and the increase of E' at −10° C. Furthermore, Example 8 showed the decrease of hardness at 23° C., but the decrease width was smaller than that in Comparative Examples 3 and 4, and the increase of E' at −10° C. as appeared in Comparative Example 2 was not observed. Rather, E' was small, and was remarkably improved. Therefore, in Example 8, E' at −10° C. could be reduced, thereby improving low temperature characteristics while suppressing the decrease of hardness at 23° C., and the balance between tan δ at 0° C. and tan δ at 60° C. could be improved.

TABLE 2

| Formulation (parts by mass) | Com. Ex. 1 | Ex. 1 | Ex. 2 | Ex. 3 | Ex. 4 | Ex. 5 | Ex. 6 | Ex. 7 | Ex. 8 | Com. Ex. 2 | Com. Ex. 3 | Com. Ex. 4 |
|---|---|---|---|---|---|---|---|---|---|---|---|---|
| Modified SBR | 70 | 70 | 70 | 70 | 70 | 70 | 70 | 70 | 70 | 70 | 70 | 70 |
| BR | 30 | 30 | 30 | 30 | 30 | 30 | 30 | 30 | 30 | 30 | 30 | 30 |
| Silica | 70 | 70 | 70 | 70 | 70 | 70 | 70 | 70 | 70 | 70 | 70 | 70 |
| Silane coupling agent 1 | 5.6 | 5.6 | 5.6 | 5.6 | 5.6 | 5.6 | 5.6 | 5.6 | 5.6 | 5.6 | 5.6 | 5.6 |
| Polymer 1 | | 10 | | | | | | | | | | |
| Polymer 2 | | | 10 | | | | | | | | | |
| Polymer 3 | | | | 10 | | | | | | | | |
| Polymer 4 | | | | | 10 | | | | | | | |
| Polymer 5 | | | | | | 10 | | | | | | |
| Polymer 6 | | | | | | | 10 | | | | | |
| Polymer 7 | | | | | | | | 10 | | | | |
| Polymer 8 | | | | | | | | | 10 | | | |
| Polymer 9 | | | | | | | | | | 10 | | |
| Polymer 10 | | | | | | | | | | | 10 | |
| Polymer 11 | | | | | | | | | | | | 10 |
| Zinc flower | 2 | 2 | 2 | 2 | 2 | 2 | 2 | 2 | 2 | 2 | 2 | 2 |

TABLE 2-continued

| Formulation (parts by mass) | Com. Ex. 1 | Ex. 1 | Ex. 2 | Ex. 3 | Ex. 4 | Ex. 5 | Ex. 6 | Ex. 7 | Ex. 8 | Com. Ex. 2 | Com. Ex. 3 | Com. Ex. 4 |
|---|---|---|---|---|---|---|---|---|---|---|---|---|
| Age resister | 2 | 2 | 2 | 2 | 2 | 2 | 2 | 2 | 2 | 2 | 2 | 2 |
| Stearic acid | 2 | 2 | 2 | 2 | 2 | 2 | 2 | 2 | 2 | 2 | 2 | 2 |
| Sulfur | 1.8 | 1.8 | 1.8 | 1.8 | 1.8 | 1.8 | 1.8 | 1.8 | 1.8 | 1.8 | 1.8 | 1.8 |
| Vulcanization accelerator | 1.8 | 1.8 | 1.8 | 1.8 | 1.8 | 1.8 | 1.8 | 1.8 | 1.8 | 1.8 | 1.8 | 1.8 |
| Secondary vulcanization accelerator | 1.5 | 1.5 | 1.5 | 1.5 | 1.5 | 1.5 | 1.5 | 1.5 | 1.5 | 1.5 | 1.5 | 1.5 |
| Property (index) | | | | | | | | | | | | |
| 0° C. tan δ | 100 | 118 | 121 | 112 | 123 | 120 | 119 | 114 | 105 | 109 | 109 | 110 |
| 60° C. tan δ | 100 | 103 | 102 | 98 | 100 | 100 | 99 | 107 | 100 | 103 | 102 | 106 |
| −10° C. E' | 100 | 96 | 93 | 90 | 100 | 102 | 100 | 115 | 87 | 130 | 94 | 96 |
| 23° C. Hardness | 100 | 100 | 98 | 97 | 98 | 97 | 97 | 100 | 93 | 92 | 86 | 86 |

Evaluation (2) of Rubber Composition

According to the formulation (parts by mass) shown in Table 3 below, a rubber composition was prepared in the same manner as in Evaluation (1) of Rubber Composition, and tan δ at 0° C. and 60° C., E' at −10° C. and hardness at 23° C. of the rubber composition obtained were measured. Each measurement result is indicated by an index as the value of Comparative Example 5 being 100. The rubber composition of the evaluation (2) is a silica-added rubber composition using a blend of unmodified SBR and unmodified BR as rubber components.

The results obtained are shown in Table 3 below. Even in the blend system of unmodified SBR/BR, as compared with Comparative Example 5 as a control, Examples 9 to 11 in which the polymers 1 to 3 as a specific liquid copolymer were added could balance tan δ at 0° C. and tan δ at 60° C. in high dimension while suppressing the decrease of hardness at 23° C. and the increase of E' at −10° C.

Furthermore, even in the case of changing the silane coupling agent from sulfide silane to mercaptosilane, as compared with Comparative Example 8 as a control, Example 12 in which the polymer 1 which is a specific liquid copolymer was used could balance tan δ at 0° C. and tan δ at 60° C. in high dimension without involving the decrease of hardness at 23° C. and the increase of E' at −10° C.

TABLE 3

| Formulation (parts by mass) | Com. Ex. 5 | Ex. 9 | Ex. 10 | Ex. 11 | Com. Ex. 6 | Com. Ex. 7 | Com. Ex. 8 | Ex. 12 |
|---|---|---|---|---|---|---|---|---|
| SBR | 70 | 70 | 70 | 70 | 70 | 70 | 70 | 70 |
| BR | 30 | 30 | 30 | 30 | 30 | 30 | 30 | 30 |
| Silica | 70 | 70 | 70 | 70 | 70 | 70 | 70 | 70 |
| Silane coupling agent 1 | 5.6 | 5.6 | 5.6 | 5.6 | 5.6 | 5.6 | | |
| Silane coupling agent 2 | | | | | | | 5.6 | 5.6 |
| Polymer 1 | | 10 | | | | | | 10 |
| Polymer 2 | | | 10 | | | | | |
| Polymer 3 | | | | 10 | | | | |
| Polymer 9 | | | | | 10 | | | |
| Polymer 10 | | | | | | 10 | | |
| Zinc flower | 2 | 2 | 2 | 2 | 2 | 2 | 2 | 2 |
| Age resisier | 2 | 2 | 2 | 2 | 2 | 2 | 2 | 2 |
| Stearic acid | 2 | 2 | 2 | 2 | 2 | 2 | 2 | 2 |
| Sulfur | 1.8 | 1.8 | 1.8 | 1.8 | 1.8 | 1.8 | 1.8 | 1.8 |
| Vulcanization accelerator | 1.8 | 1.8 | 1.8 | 1.8 | 1.8 | 1.8 | 1.8 | 1.8 |
| Secondary vulcanization accelerator | 1.5 | 1.5 | 1.5 | 1.5 | 1.5 | 1.5 | 1.5 | 1.5 |
| Property (Index) | | | | | | | | |
| 0° C. tan δ | 100 | 121 | 124 | 112 | 112 | 113 | 111 | 133 |
| 60° C. tan δ | 100 | 103 | 102 | 96 | 105 | 100 | 82 | 85 |
| −10° C. E' | 100 | 97 | 96 | 95 | 137 | 97 | 101 | 99 |
| 23° C. Hardness | 100 | 98 | 98 | 97 | 90 | 87 | 94 | 94 |

Evaluation (3) of Rubber Composition

According to the formulation (parts by mass) shown in Table 4 below, a rubber composition was prepared in the same manner as in Evaluation (1) of Rubber Composition, and tan δ at 0° C. and 60° C., E' at −10° C. and hardness at 23° C. of the rubber composition obtained were measured. Each measurement result is indicated by an index as the value of Comparative Example 9 being 100. The rubber composition of the evaluation (3) is a silica- and carbon black-added rubber composition using NR alone as a rubber component.

The results obtained are shown in Table 4 below. Even in the NR system, as compared with Comparative Example 9 as a control, Examples 13 to 15 in which the polymers 1 to 3 as specific liquid copolymers were added could balance tan δ at 0° C. and tan δ at 60° C. in high dimension while suppressing the decrease of hardness at 23° C. and the increase of E' at −10° C.

TABLE 4

| Formulation (parts by mass) | Com. Ex. 9 | Ex. 13 | Ex. 14 | Ex. 15 | Com. Ex. 10 | Com. Ex. 11 |
|---|---|---|---|---|---|---|
| NR | 100 | 100 | 100 | 100 | 100 | 100 |
| Silica | 40 | 40 | 40 | 40 | 40 | 40 |
| Carbon black | 30 | 30 | 30 | 30 | 30 | 30 |
| Silane coupling agent 1 | 3.2 | 3.2 | 3.2 | 3.2 | 3.2 | 3.2 |
| Polymer 1 | | 10 | | | | |
| Polymer 2 | | | 10 | | | |
| Polymer 3 | | | | 10 | | |
| Polymer 9 | | | | | 10 | |
| Polymer 10 | | | | | | 10 |
| Zinc flower | 2 | 2 | 2 | 2 | 2 | 2 |
| Age resister | 2 | 2 | 2 | 2 | 2 | 2 |
| Stearic acid | 2 | 2 | 2 | 2 | 2 | 2 |
| Sulfur | 1.8 | 1.8 | 1.8 | 1.8 | 1.8 | 1.8 |
| Vulcanization accelerator | 1.8 | 1.8 | 1.8 | 1.8 | 1.8 | 1.8 |
| Secondary vulcanization accelerator | 1.5 | 1.5 | 1.5 | 1.5 | 1.5 | 1.5 |
| Property (Index) | | | | | | |
| 0° C. tan δ | 100 | 125 | 127 | 117 | 114 | 115 |
| 60° C. tan δ | 100 | 100 | 100 | 99 | 102 | 101 |
| −10° C. E' | 100 | 98 | 97 | 97 | 117 | 98 |
| 23° C. Hardness | 100 | 100 | 98 | 98 | 93 | 90 |

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A rubber composition comprising 100 parts by mass of a rubber component comprising a diene rubber, and from 1 to 100 parts by mass of a copolymer comprising:
a monomer unit (a) derived from a compound represented by the following formula (1):

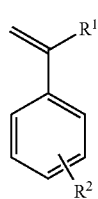

(1)

wherein $R^1$ represents a hydrogen atom or a methyl group, $R^2$ represents a branched alkyl group having from 3 to 8 carbon atoms; and a monomer unit (b) derived from a compound represented by the following formula (2):

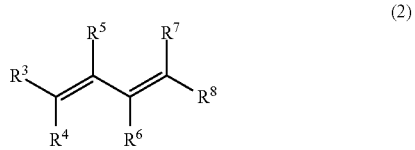

(2)

wherein $R^3$, $R^4$, $R^5$, $R^6$, $R^7$ and $R^8$ may be the same or different, at least one of those groups represents an aliphatic hydrocarbon group having from 3 to 8 carbon atoms, and the remainder represents a hydrogen atom or an aliphatic hydrocarbon group having 1 or 2 carbon atoms;

the copolymer having a weight average molecular weight (Mw) of from 1,000 to 50,000;

wherein the rubber component comprises 50 mass % or more of a modified styrene-butadiene rubber modified with at least one functional group selected from the group consisting of an amino group, a hydroxyl group, an epoxy group, an alkoxy group, an alkylsilyl group, an alkoxysilyl group and a carboxyl group.

2. The rubber composition according to claim 1, wherein a copolymerization ratio of the monomer unit (b) is from 20 to 80 mol %.

3. The rubber composition according to claim 1, wherein the copolymer has a glass transition temperature of from −60 to 20° C.

4. The rubber composition according to claim 1, wherein the aliphatic hydrocarbon group having from 3 to 8 carbon atoms in the formula (2) has at least one double bond.

5. The rubber composition according to claim 1, wherein the compound represented by the formula (1) is tert-butyl-styrene, and the compound represented by the formula (2) is at least one selected from the group consisting of myrcene, ocimene, allo-ocimene and cosmene.

6. A pneumatic tire comprising the rubber composition according to claim 1 as a part thereof.

7. The rubber composition according to claim 1, wherein the compound represented by the formula (1) is tert-butyl-styrene.

8. The rubber composition according to claim 1, wherein the compound represented by the formula (2) is ocimene.

9. The rubber composition according to claim 7, wherein the compound represented by the formula (2) is ocimene.

* * * * *